(12) United States Patent
Lund

(10) Patent No.: US 6,850,339 B1
(45) Date of Patent: Feb. 1, 2005

(54) RESOLUTION ENHANCEMENT OF HALF-TONED BLACK DATA TRANSMITTED WITH COLOR DATA

(75) Inventor: Mark D. Lund, Vancouver, WA (US)

(73) Assignee: Hewlett Packard Development Company, Houston, TX (US)

( * ) Notice: Subject to any disclaimer, the term of this patent is extended or adjusted under 35 U.S.C. 154(b) by 0 days.

(21) Appl. No.: 09/533,450

(22) Filed: Mar. 23, 2000

(51) Int. Cl.[7] .............................................. C06K 1/00
(52) U.S. Cl. ..................... 358/1.2; 358/1.9; 358/534; 382/162; 382/299
(58) Field of Search ......................... 358/1.2, 1.9, 534, 358/443, 447, 448, 2.99; 382/162, 299, 266, 269

(56) References Cited

U.S. PATENT DOCUMENTS

| | | | | |
|---|---|---|---|---|
| 4,866,532 A | * | 9/1989 | Ayata et al. ................. | 358/443 |
| 5,231,519 A | * | 7/1993 | Koike ......................... | 358/456 |
| 5,282,057 A | | 1/1994 | Mailloux et al. | |
| 5,483,355 A | | 1/1996 | Overton ...................... | 358/463 |
| 5,516,216 A | | 5/1996 | McDonough et al. .. | 400/124.01 |
| 5,563,721 A | | 10/1996 | Overton ...................... | 358/447 |
| 5,650,858 A | | 7/1997 | Lund ........................... | 358/298 |

OTHER PUBLICATIONS

United Kingdom Search Report, Sep. 4, 2001.

* cited by examiner

Primary Examiner—Thomas D. Lee

(57) ABSTRACT

When black regions are adjacent to color regions, the adjacent black regions are encoded (rendered) at the resolution of the color regions (e.g., 300 dpi) even though the printer has the capability of printing black at a higher resolution (e.g., 600 dpi). To make full use of the 600 dpi resolution of the printer, the black pixels are separated from the color pixels. The 300 dpi resolution black pixel field is converted to a 600 dpi black image field. A window surrounding a selected group of (600 dpi) black/white target pixels is chosen. The pixels in the window are applied to a logic circuit having a plurality of logical conditions. As a result of the logic processing, values of each of the target pixels can be changed to a different pixel value to avoid jagged edges in the printed images, thereby providing a pseudo-600 dpi resolution for the target pixels. The logical operations are performed until all of the pixels have values determined by the logic circuit. The resulting processed pixel field provides a more satisfactory printed image. The window is selected so that the pixel fields can be represented by word-length data groups. Black pixels rendered at the higher resolution are generally unaffected by the logic circuit. Thus, black pixels are rendered at two resolutions but printed at the same resolution.

14 Claims, 4 Drawing Sheets

RESOLUTION ENHANCEMENT OF HALF-TONED BLACK DATA TRANSMITTED WITH COLOR DATA

BACKGROUND OF THE INVENTION

1. Field of the Invention

This invention relates generally to printing images defined by electrical signals and, more particularly, to the enhancement of black images when rendered at a resolution (e.g., 300 dpi) of color images but printed by a higher resolution print cartridge (e.g., 600 dpi).

2. Description of the Related Art

In some printer systems, an image can contain color regions, isolated black regions, and regions with adjacent black and color regions. The black regions can, for example, include black letters within a color region. Some printers are able to render (process) isolated black text at a resolution of 600 dots per inch (dpi) and print the black dots using a 600 dpi print cartridge. In this case, the resolution of the black text is truly at a 600 dpi resolution.

It is common for such printers to only render color images at a resolution of 300 dpi, upscale the data, and then halftone the image at this higher resolution data for printing with higher resolution capable print systems (higher dpi print cartridges do not increase the resolution of dots rendered at a lower resolution). Rendering the color pixels at 300 dpi is much less processor intensive than rendering the color pixels at 600 dpi. There is little loss in image quality in this method, since most practical color images are stored at less that 300 dpi. There is a slight loss in color text sharpness in this method. It is important to provide a high resolution for black ink due to its high contrast with white paper, so printing black, especially text, at the lower resolution may be objectionable. The term "upscaled" in this application refers to doubling the data in both axis—a very simple 2×expansion vertically and horizontally (or could it be described as replicating horizontally and vertically).

In certain situations, such as where black pixels are adjacent color pixels, the black image is rendered at the same "lower" resolution (e.g., 300 dpi) of the color image. In other words, for those areas where the black regions are adjacent color regions, the mixed region is encoded in the 300 dpi format. This is sometimes referred to as the black pixels being processed through the color pipeline.

The lower resolution black regions (e.g., text), rendered with the color at the color resolution, is upscaled with the color data, and then merged with the higher resolution (600 dpi) black data, such as isolated text. The resulting data-doubled text is referred to as "chunky" text. An example of chunky text can be found in FIG. 1A. For comparison, FIG. 1B is an example of script that has been rendered at 600 dpi.

Thus, even though the printer mechanism has the capability to print black pixels at 600 dpi, the black regions rendered at 300 dpi along with the color regions remain encoded for 300 dpi, and simply doubling the pixels provides no apparent increased resolution.

Additionally, some systems may choose to render an entire page at a lower resolution, say 300 dpi, upscale the image to 600 dpi, and then halftone this image at 600 dpi. The image will render much faster at the lower resolution of 300 dpi, and the halftoning of the upscaled data will result in smooth transitions between colors, and be nearly indistinguishable from 600 dpi rendering. Color text will be compromised in this mode. However, when true 300 dpi black text is upscaled and halftoned at 600 dpi, the pixel replication of the true black data still exhibits low resolution edge characteristics.

Systems for smoothing jagged edges of text are known; however, such systems do not address the situation where black images are rendered by the color pipeline. One smoothing algorithm is referred to as a TES (thermal inkjet edge smoothing) algorithm, described in U.S. Pat. No. 5,650,858, entitled "Pixel Image Edge-Smoothing Method and System," invented by Mark D. Lund, assigned to the assignee of the present invention and incorporated by reference herein. There is a need for an apparatus and an associated method having the feature that black image regions rendered along with color image regions are resolution-enhanced and printed with a resolution higher than that of the color image regions. Another desired feature of the apparatus and the associated method is the representation of the data groups used in processing the black pixel images in word-length data groups.

SUMMARY

The aforementioned and other features are accomplished, according to one embodiment of the present invention, by the following method. The black and color pixels being rendered at the color resolution (e.g., 300 dpi) are upscaled by simple pixel replication and halftoned, causing the black data to be upscaled to 600 dpi. Black data, such as isolated text, rendered at the higher resolution (600 dpi) is then merged with the upscaled data. The merged black pixels are separated from the color pixels.

A target pixel group in the black image is selected. If the portion of the black image being processed was previously rendered at the color resolution, then the target pixel group represents a single pixel in the rendered 300 dpi image (i.e., four 600 dpi pixels in the group). Then, a window of neighboring pixels in the 600 dpi image surrounding the target group is chosen. In one embodiment, the window is selected to permit a row of pixels within the chosen window to be represented by word-size data groups of 16 bits or less. In one embodiment, the window is an array of a maximum of 13×13 pixels.

The pixels within the chosen window are applied to a logic array that inputs pixel patterns and computes modified target pixels, if necessary, to provide an optimal image subject to a number of (sometimes conflicting) constraints. The values of the pixels in the target group, after processing by the logic array, are enhanced resolution pixel values, and the processed pixel group is stored in place of the target group. The process is continued until all of the pixels comprising the original image have been processed. Typically, those pixels in the black image rendered at the higher resolution will not be changed by the logic array, but they still may be changed depending on the "programming" of the logic array.

The processed black pixels are then printed by a 600 dpi printhead. Thus, certain black pixels on the page will have been rendered at 300 dpi and some will have been rendered at 600 dpi, but the resolutions will appear similar. The color portion of the image is printed at its rendered (non-enhanced) print resolution, such as at 300 dpi. The invention applies to any resolution.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1A:
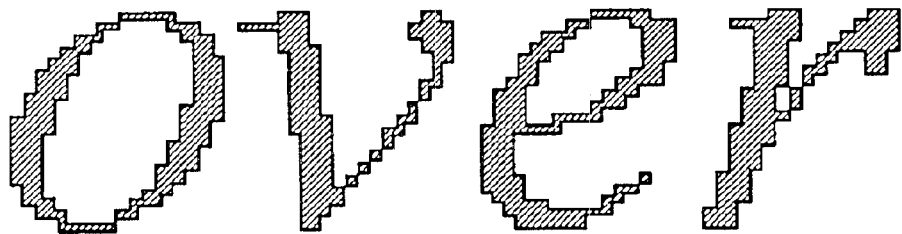
FIG. 1A illustrates chunky text, which was encoded (rendered) at a resolution of 300 dpi and then upscaled to match the input size to a 600 dpi grid for printing by a 600 dpi black printhead.
Figure 1B:
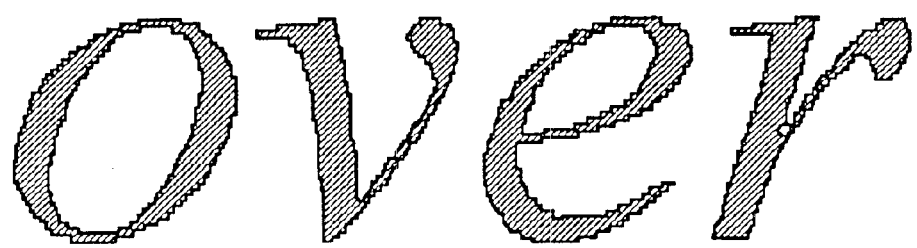
FIG. 1B illustrates text rendered at 600 dpi.
Figure 2:
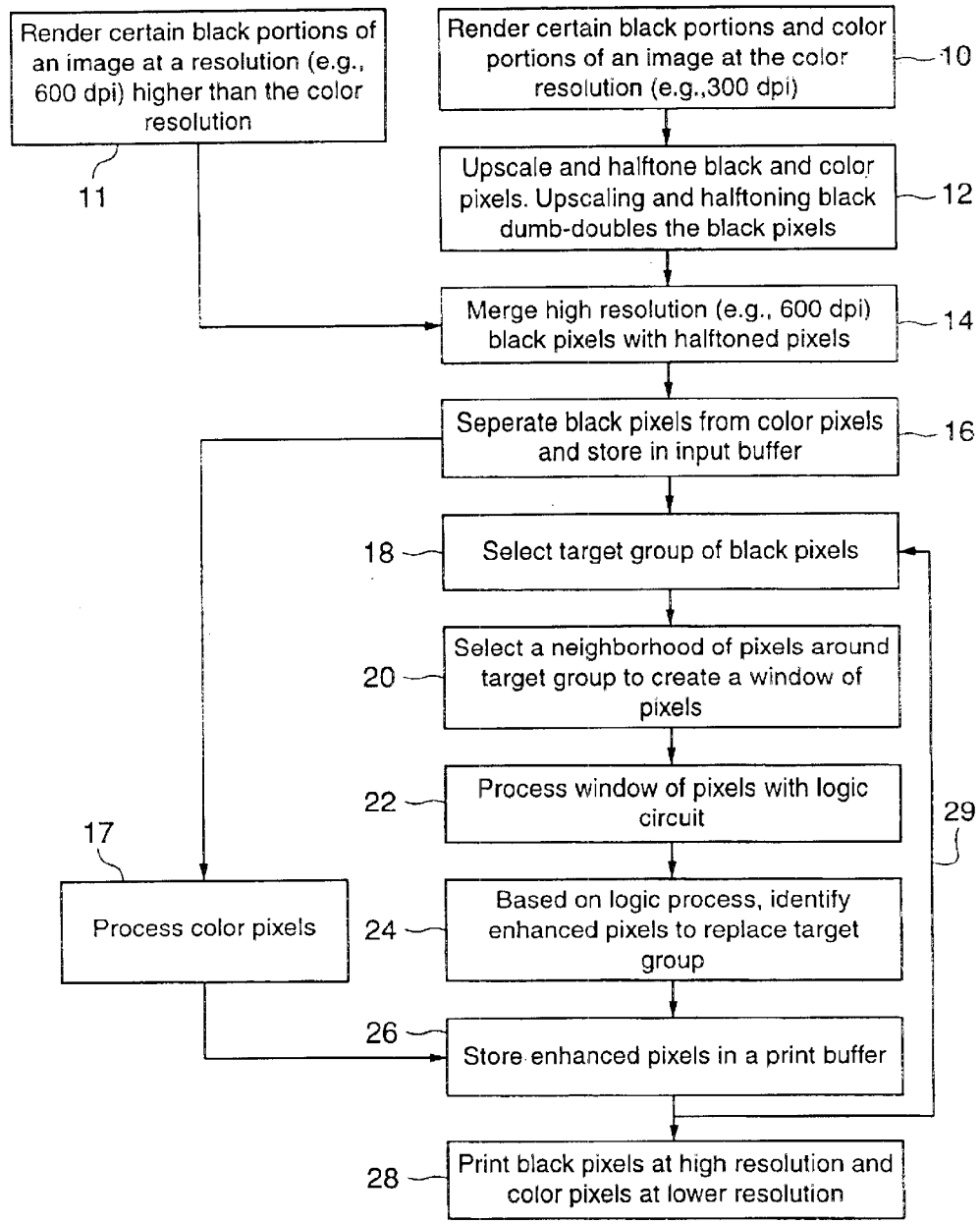
FIG. 2 is a flowchart illustrating the resolution-enhancement of the pixels of the black regions according to the present invention.

Referring to FIG. 2, a flowchart for enhancing the resolution of black regions rendered at a resolution of color regions is shown. In one embodiment, black regions adjacent to color regions of an image are rendered at the same resolution of the color regions (e.g., 300 dpi). Other black regions, such as isolated black text, are rendered at a higher resolution (e.g., 600 dpi). In the example below, it is assumed that the black and color pixels are rendered at the color resolution of 300 dpi, and the invention enhances the black data to have a resolution of 600 dpi image, although the invention applies to any resolution. Any black data rendered at the 600 dpi resolution does not require any enhancement.

In step 10, original pixels are generated by, for example, a personal computer, and processed (rendered) so as to be in the printer color space. The black regions of the image adjacent to color regions are rendered at the resolution of the color regions.

In step 11, isolated black regions, such as text, are rendered at the higher resolution.

In step 12, the upscaling and halftoning algorithms are performed on the black and color pixels from step 10. For the color pixels, the halftoning algorithm identifies discrete color dots to be printed and effectively distributes the color error to neighboring pixels. The halftoning causes the perceived color in an area on the medium to closely match the desired color. However, when the upscaling and halftoning are performed on the true black pixels, there is no distribution of error since the original dots are either black or white. The upscaling algorithm converts the 300 dpi black pixels to 600 dpi black pixels. The 600 dpi is chosen because that is the dpi resolution of the black printhead in one embodiment. The result of the upscaling step is that each of the transmitted black and white pixels rendered at 300 dpi is duplicated to form a pixel field at a resolution of 600 dpi (i.e., each original pixel is duplicated four times). This step can be accomplished by remapping the pixels in an input buffer or by a pixel relabeling step. This 600 dpi pixel field has not yet been enhanced. The dpi can be greater than 600 dpi (e.g., 1200 dpi, 2400 dpi, etc.), or the dpi in the vertical and horizontal directions may be different.

In step 14, any black pixels, such as isolated text, rendered at 600 dpi is merged with the halftoned pixels.

In step 16, the black pixels are separated from the color pixels. This simply diverts the processing path of the color pixels away from the resolution enhancement process for the black pixels, and allows the color pixels to be processed in any conventional manner (step 17).

In step 18, assuming the black pixels being processed were rendered at 300 dpi, an original 300 dpi pixel (a target pixel), as now represented by a target group of four unprocessed pixels, is selected for processing in order to generate four enhanced, high resolution pixels.

In step 20, a pre-established neighborhood or window of 600 dpi unprocessed pixels surrounding the target group of four unprocessed pixels is identified. The unprocessed pixels in the window are encoded in a logic signal format, and the encoded logic signals are processed by a logic circuit (e.g., a logic array) in step 22. The logic circuit (described in more detail later) performs logical operations on the pixel window and changes the target pixels if necessary.

In step 24, the four pixel values output from the logic circuit replace the target group of four pixels in the window. These pixel values may be the same as the selected unprocessed pixel values, or the selected unprocessed pixel values can be altered.

The processed pixels that replace the selected unprocessed pixels are stored in a print buffer in step 26. The color pixels that have undergone conventional processing are also stored in a print buffer.

In step 28, after the print buffer has stored a certain number of pixels, the pixels stored in the print buffer are forwarded to the print engine. The print engine generates the timed printhead energization signals for printing the black portion of an image at the 600 dpi resolution. Since color pixels are not enhanced, the color pixels are still printed at the halftoning resolution.

In step 29, the procedure returns to step 18 until all of the pixels have been printed.

Figures 3A, 3B:
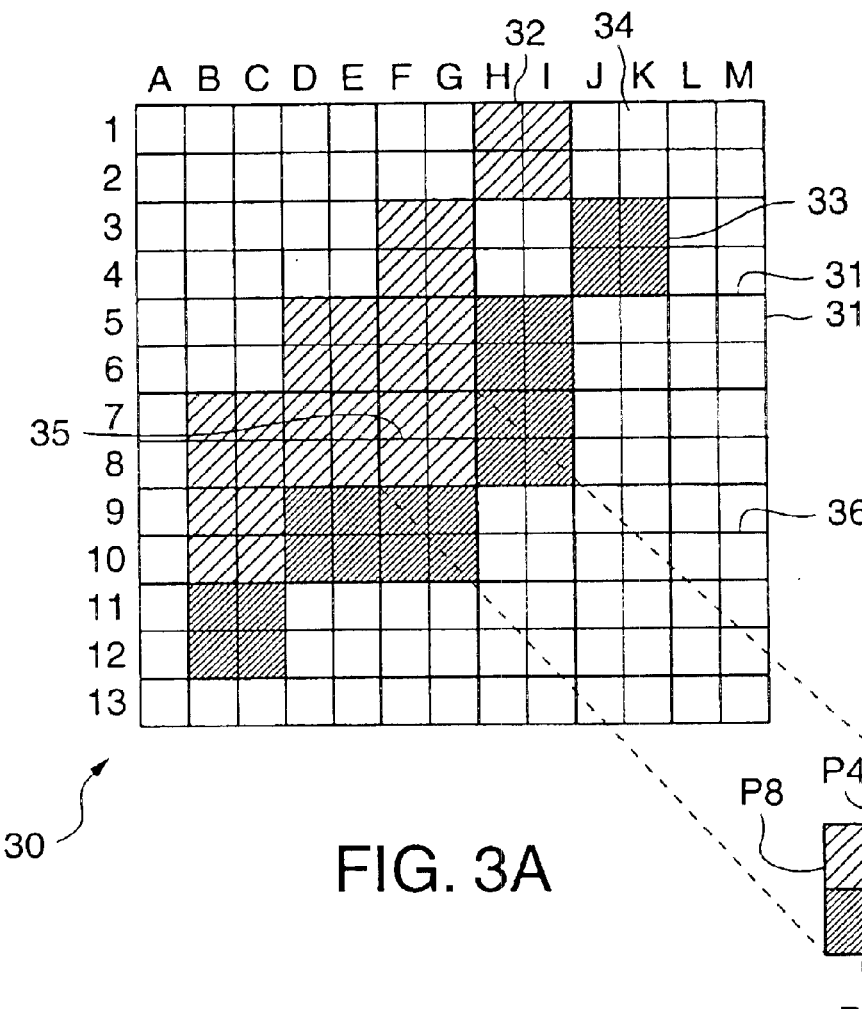
FIG. 3A is a representation of a particular logical condition for identifying a 4-pixel 600 dpi resolution pixel group to replace an original 300 dpi resolution pixel when the logical condition is met by a window of pixels.
FIG. 3B illustrates the values of the enhanced 600 dpi pixel group when the window of pixels meets the logical condition of FIG. 3A.

Referring to FIG. 3A and FIG. 3B, an example of the use of the logic circuit to provide an enhanced 600 dpi pixel image from a 300 dpi pixel image is illustrated. FIG. 3A is a representation of a logical condition 30 met by the pixel window. The heavier grid lines 31 define the original 300 dpi pixel areas. The original pixels in the 300 dpi format are shown by, for example, pixel groups 32, 33, and 35. The darker areas define the black pixels 33. The lighter areas denote the white pixels 32. The blank areas denote the "don't care" pixels 34, which can be either black pixels or white pixels. In order to achieve a 600 dpi pixel resolution, as indicated above, each 300 dpi pixel is divided into four pixels. The logical condition 30 in FIG. 3A illustrates the division of the 300 dpi pixels by the lighter grid lines 36. The logical condition 30 takes into account the neighborhood or window surrounding the target pixel group 35.

Shown in FIG. 3B are the four processed pixels associated with the logical condition 30 of FIG. 3A that replace the four pixels in the target group 35. When the logical condition 30 is met, the pixel values associated with the logical condition 30 replace the values of the pixels in the target group. In FIG. 3B, for example, the processed black pixels labeled P1, P2, and P4 replace corresponding unprocessed white pixels in the target group 35. The processed pixel P8 of FIG. 3B has a value that is unchanged from the value of the corresponding unprocessed pixel of the target group 35.

The number of different logical conditions programmed into the logic circuit, the particular logical conditions, and the values of the processed pixels are established empirically by determining, from resulting images, which logical conditions and associated processed pixel values provide the highest quality, pseudo-600 dpi image. These logical conditions and processed pixel values accommodate the often conflicting goals of: preserving the image stroke weight to the extent possible; minimizing shifts in input pixel image features, and when shifting an image is necessary, shifting the image features minimally in the same direction; smoothing character fonts in such a manner that curves, intersections, endpoints and serifs are accurately reproduced; and preserving halftones of graphic or pictorial images. For purposes of illustrating the present invention, the logical condition set found in U.S. Pat. No. 5,650,858, incorporated herein by reference, may be used. It will be appreciated that the window of neighboring pixels used in the described embodiment of the present invention is larger than the window found in the '858 patent.

The logical conditions may be represented by simple logic equations. An example of a logical condition defined by a Boolean equation is given by following equation, the equation defining the pixel pattern (logical condition T39) of FIG. 3A.

$$T39 = \neg H1 \cap \neg I1 \cap$$

$$H2 \cap \neg I2 \cap \neg F3 \cap$$

$$G3 \cap J3 \cap K3 \cap \neg F4 \cap$$

$$G4 \cap J4 \cap K4 \cap \neg D5 \cap$$

$$E5 \cap \neg F5 \cap \neg G5 \cap H5 \cap$$

$$I5 \cap \neg D6 \cap \neg E6$$

$$\cap \neg F6 \cap \neg G6 \cap$$

$$H6 \cap I6 \cap \neg B7 \cap \neg C7 \cap$$

$$D7 \cap \neg E7 \cap \neg F7 \cap$$

$$G7 \cap H7 \cap I7 \cap \neg B8 \cap$$

$$C8 \cap \neg D8 \cap \neg E8 \cap$$

$$F8 \cap \neg G8 \cap H8 \cap I8 \cap$$

$$B9 \cap \neg C9 \cap D9 \cap E9 \cap$$

$$F9 \cap G9 \cap \neg B10 \cap$$

$$C10 \cap D10 \cap E10 \cap F10 \cap$$

$$G10 \cap B11 \cap C11 \cap B12 \cap C12$$

The ¬ symbol before an index of the coordinates of a pixel indicates a white unprocessed pixel at that position and a white pixel in the logical condition T39. No symbol before an index indicates a black unprocessed pixel at that position and a black pixel in the logical condition T39. The ∩ symbol represents a logical AND operation. The positions not identified are "don't care" positions in the window. For example, matching a pixel window with the T39 logical condition requires a white pixel in positions H1, I1, H2, I2, F3, G3, F4, etc., and a black pixel in positions J3, K3, etc.

In addition to the logical equations of the form shown above used to determine if the unprocessed pixels meet a logical condition, a second group of logical equations is needed to generate the processed pixel values for the target group pixels. These simple logical equations determine whether the value of each of the pixels in the target group changes or remains the same. The logic equations are reflected in FIG. 3B.

As indicated above, the pixels P1, P2, and P4 change value, while pixel P8 retains the same value, as a result of the logic processing. The change of the value of the pixels can be represented by Change_P1=. . . ∪T39∪. . . . Change_P2=. . . ∪T39∪. . . ; and Change_P4 . . . ∪T39∪. . . . No equation is provided for P8 because the P8 pixel does not change as a result of the matching of the window of pixels with the T39 logical condition.

The logical conditions used in one embodiment of the invention enable a window of only a 13×13 pixel array. Such sizes can use a single word (16 bits) to convey a row of pixels in the window. Any size equal to or less than a word size offers great advantages in circuit complexity and speed.

Figure 4:
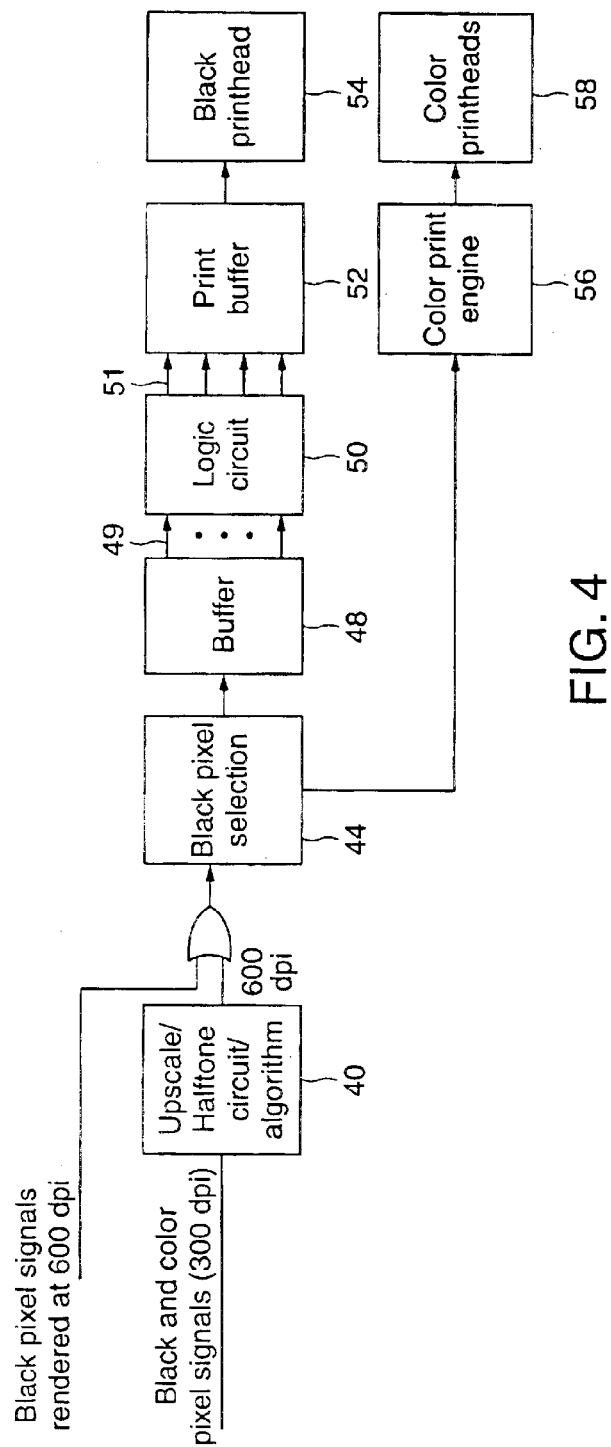
FIG. 4 is a block diagram of apparatus for generating enhanced pixel values or selected black pixels according to one embodiment of the present invention.

Referring to FIG. 4, a functional block diagram of the printer/controller apparatus according to one embodiment of the present invention is shown. The color pixels and certain black pixels rendered at 300 dpi are applied to an upscaling and halftoning algorithm 40, previously described. The upscaling and halftoning of the black pixels upscales the 300 dpi black pixels to create a 600 dpi black pixel pattern. Upscaling and halftoning are also performed on the color pixels, as previously described with respect to FIG. 2, but since the color processing is conventional, it is not described in detail. The upscaling and halftoning of the color pixels is assumed to also double the color pixels (but not increase the resolution) in order to achieve a desired drop volume of a color dot.

Any "original" 600 dpi black pixel data rendered at 600 dpi is then merged with the output of the halftoning process. Such 600 dpi black pixel data rendered at 600 dpi would typical include black text separated from any color image. The merging may be accomplished with an OR gate 42. Merging can be accomplished at various points along the process path for the black pixels.

The black pixels are separated from the color pixels so as to be processed by different paths. In one embodiment, the black (K) and C, M, and Y data reside on different memory "planes," and the black pixel selection circuit 44 simply diverts the black data to be processed along the upper path. The term "selection" applies to both cases.

The black pixels are then mapped in a buffer 48.

Pixels in buffer 48 forming the target pixels and the neighborhood of pixels are addressed and applied to a logic circuit 50. In the embodiment of a 13×13 pixel window, buffer 48 applies 169 pixel values on lines 49 to logic circuit 50. Logic circuit 50 is a conventional logic array that contains all the logical conditions and the logic that modifies the target pixels. As a result of this logical process, the target group of pixels is replaced with processed values (e.g., 4 values on lines 51) and stored in the print buffer 52. Any originally rendered 600 dpi black pixel data (e.g., conventional text) may or may not be changed by the logic circuit 50. After a pixel image has been assembled in the print buffer 52, at the appropriate time, the image is applied to the print engine, and the black portion of the image is printed by the black printhead 54.

The color pixels are concurrently processed in a conventional manner by the color print engine 56 (including buffer, timing circuits, etc.) and printed by printheads 58.

The logic operation can be implemented in hardware, firmware, software, or combinations thereof without departing from the scope of the invention. Those skilled in the art can readily implement the invention using commercially available hardware.

An example of a color printer that may employ the present invention is found in U.S. Pat. No. 5,648,806, assigned to Hewlett-Packard and incorporated herein by reference.

Figure 5:
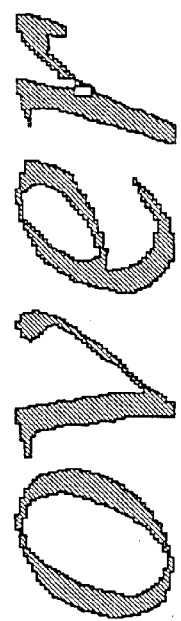
FIG. 5 illustrates text which has been algorithmically enhanced from an image rendered at 300 dpi image and printed at 600 dpi using the techniques described herein.

FIG. 5 is a magnified view of text rendered at 300 dpi but enhanced to 600 dpi using the present invention. The logical conditions of the described embodiment use a 13×13 window. By using a 13×13 pixel matrix, a line (or column) of the image can be represent by a word-length group of binary bits (16 bits), the word being particularly convenient for use in processing apparatus.

Those skilled in the art will be able to implement the devices disclosed herein without undue experimentation and will understand that the process parameters, materials, dimensions, and sequence of steps are given by way of example only and can be varied to achieve the desired results. Variations and modifications of the embodiments disclosed herein may be made based on the description set forth herein without departing from the spirit and scope of the invention as set forth in the following claims. In particular, the invention has been described with respect to a rendered image pixel resolution of 300 dpi in conjunction with a 600 dpi printer. Other combinations of pixel image resolution and printer resolution are within the scope of the invention.

What is claimed is:

1. A method for enhancing the resolution of black image regions rendered at a resolution of color image regions, the black image regions and color image regions being represented by pixels, the black image regions and color image regions having a first resolution, the first resolution being lower than a maximum black printing resolution of a printer, the method comprising:

generating black pixels and color pixels at said first resolution;

separating the black pixels from the color pixels to form a black pixel field:

for each original pixel of the black image region of the black pixel field having the first resolution,
multiplying said pixel in two dimensions to obtain a first array of pixels, so as to represent the original pixel by a plurality of target pixels in the first array;

forming a sub-array of the first pixel array that includes said target pixels and a plurality of neighboring pixels constituting a pixel window;

applying the pixels in the pixel window of the sub-array to a logic circuit having a plurality of logical conditions;

creating enhanced resolution pixels by modifying the target pixels based on whether said pixel window meets one of the plurality of logical conditions; and printing said enhanced resolution pixels at a second resolution as well as said color pixels at said first resolution.

2. The method as recited in claim 1, the method further comprising:

forming a processed pixel image by repeating the selecting through the determining steps until all of the original pixels have been processed.

3. The method as recited in claim 1 wherein the first resolution is 300 dots per inch (dpi) and the second resolution is 600 dpi.

4. The method as recited in claim 1, further comprising empirically determining the logical conditions.

5. The method as recited in claim 1, wherein said step of printing further comprises printing black pixels rendered at the second resolution.

6. The method as recited in claim 1 wherein the pixel window has rows represented by bits equal to or less than a word size.

7. The method as recited in claim 1 wherein the pixels in the pixel window form a 13×13 pixel matrix.

8. An apparatus for enhancing the resolution of black image regions rendered at a resolution of color image regions, the black image regions and color image regions being represented by pixels, the black image regions and color image regions having a first resolution, the first resolution being lower than a maximum black printing resolution of a printer, the apparatus comprising:

an upscaling circuit for separating black pixels from color pixels to form a black pixel field, for multiplying a number of the black pixels in the black pixel field to form a first array of black pixels, said first array including a group of target pixels and for forming a sub-array of the first array that includes said target pixels and neighboring pixels;

a logic circuit for receiving said target pixels and neighboring pixels, forming a window of pixels from the target pixels and the neighboring pixels, said logic circuit applying logical conditions to said window of pixels and creating enhanced resolution pixels for said group of target pixels by modifying the target pixels if the sub-array meets the logical conditions; and at least one printhead for printing said enhanced resolution pixels at a second resolution and color pixels at said first resolution.

9. The apparatus as recited in claim 8, wherein the logic circuit comprises a logic array.

10. The apparatus as recited in claim 8 wherein the first resolution is 300 dots per inch (dpi) and the second resolution is 600 dpi.

11. The apparatus as recited in claim 8 wherein the logical conditions are empirically derived.

12. A method for enhancing black image regions of a pixel field that are rendered at the same first resolution of color image regions, the method comprising:

separating black pixels from color pixels to form a black pixel field;

multiplying the number of pixels in the black pixel field to form a first pixel array:

forming a sub-array of the first pixel array, the sub-array including a target group of pixels;

applying the sub-array to a logic circuit identifying a plurality of logical conditions;

based on whether the sub-array meets a logical condition, modifying said target group of pixels to reduce jagged edges of said black image regions; and printing the modified target group of pixels at an increased resolution and printing color pixels at said first resolution.

13. The method as recited in claim 12 wherein said multiplying is performed by upscaling.

14. The method of claim 13 wherein the initial resolution of the black pixel field is 300 dots per inch (dpi), and the resolution of the modified target pixels is 600 dpi.

* * * * *